(12) United States Patent
Takahashi

(10) Patent No.: US 9,274,357 B2
(45) Date of Patent: Mar. 1, 2016

(54) LIQUID CRYSTAL DISPLAY DEVICE

(71) Applicant: Japan Display Inc., Mobara-shi, Chiba-ken (JP)

(72) Inventor: Satoshi Takahashi, Isumi (JP)

(73) Assignee: Japan Display Inc., Tokyo (JP)

( * ) Notice: Subject to any disclaimer, the term of this patent is extended or adjusted under 35 U.S.C. 154(b) by 317 days.

(21) Appl. No.: 13/851,137

(22) Filed: Mar. 27, 2013

(65) Prior Publication Data

US 2013/0271702 A1    Oct. 17, 2013

(30) Foreign Application Priority Data

Apr. 17, 2012    (JP) ................................. 2012-094046

(51) Int. Cl.
*G02F 1/133* (2006.01)
*G09G 3/34* (2006.01)
*H05B 33/08* (2006.01)

(52) U.S. Cl.
CPC .......... *G02F 1/13306* (2013.01); *G09G 3/3406* (2013.01); *H05B 33/0815* (2013.01); *G09G 2320/043* (2013.01); *G09G 2320/064* (2013.01); *Y02B 20/346* (2013.01)

(58) Field of Classification Search
CPC .................................................. G02F 1/13306
See application file for complete search history.

(56) References Cited

U.S. PATENT DOCUMENTS

2008/0122291 A1* 5/2008 Uchimoto et al. ............... 307/31
2009/0009104 A1* 1/2009 Doi et al. ....................... 315/291

FOREIGN PATENT DOCUMENTS

JP    2011-138666    7/2011

OTHER PUBLICATIONS

Machine Translation of JP2011-138666A.*
Chinese Office Action issued by SIPO dated Nov. 26, 2014 of corresponding Chinese application No. 201310116600.X.

* cited by examiner

*Primary Examiner* — Thuy Vinh Tran
*Assistant Examiner* — Pedro C Fernandez
(74) *Attorney, Agent, or Firm* — Typha IP LLC

(57) ABSTRACT

A main voltage step-up circuit includes a coil which one end thereof is connected to a power supply; a main switching element which is connected between the other end of the coil and a ground potential, and which is controlled by the main control circuit; a diode which is connected to the other end of the coil; a smoothing capacitor which is connected to the diode and is a ceramic capacitor; and an auxiliary voltage step-up circuit which is connected to the other end of the coil. The auxiliary voltage step-up circuit is ON when the main step-up voltage circuit is OFF, and compensates a potential change in the smoothing capacitor. The auxiliary voltage step-up circuit includes an auxiliary switching element which is connected between the other end of the coil and a ground potential; and an auxiliary control circuit which controls the auxiliary switching element.

5 Claims, 6 Drawing Sheets

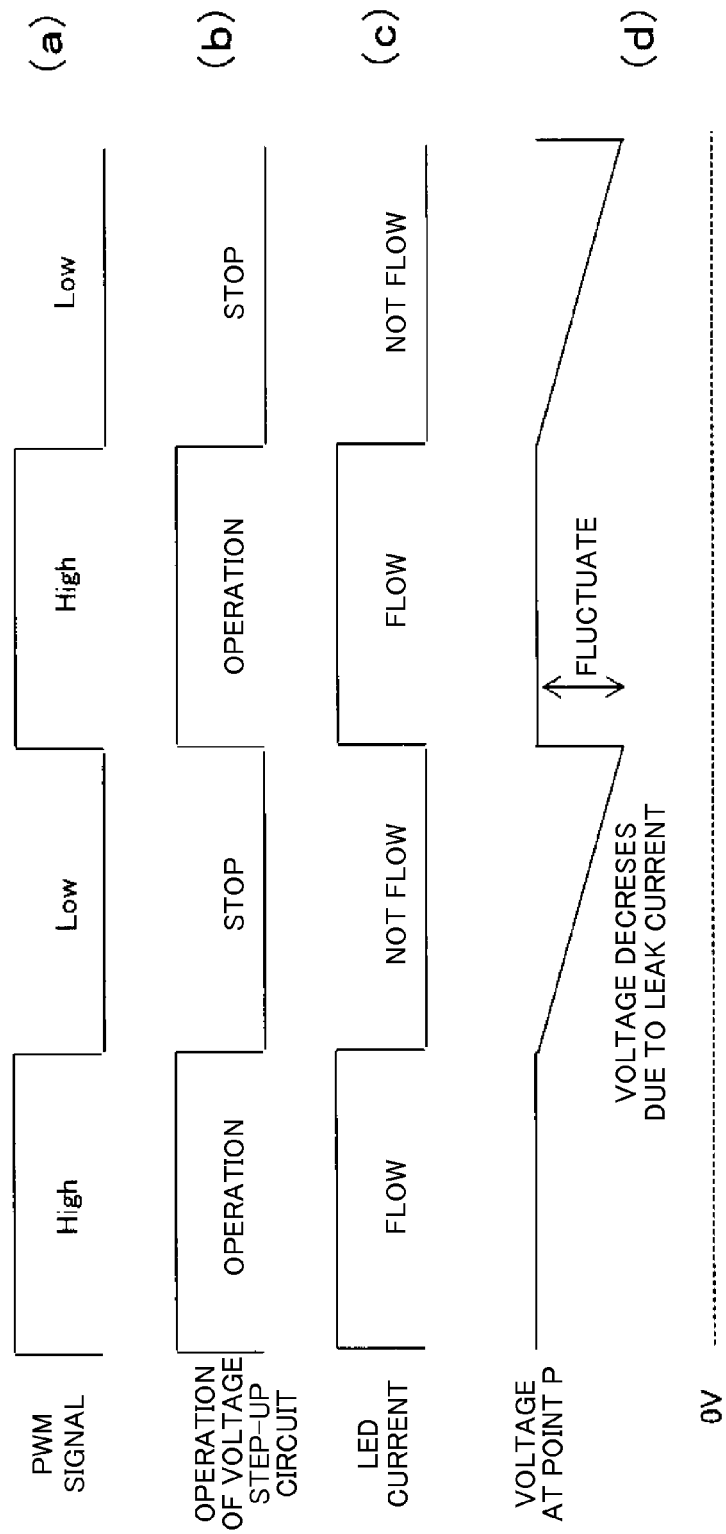

LIQUID CRYSTAL DISPLAY DEVICE

CROSS-REFERENCE TO RELATED APPLICATION

The present application claims priority from Japanese application JP2012-094046 filed on Apr. 17, 2012, the content of which is hereby incorporated by reference into this application.

BACKGROUND OF THE INVENTION

1. Field of the Invention

The present invention relates to a liquid crystal display device, and in particular, to a driving circuit of a white light emitting diode which configures a light source of a backlight.

2. Description of the Related Art

A small liquid crystal display device of a Thin Film Transistor (TFT) type in which a thin film transistor (TFT) is used as an active element has been widely used in a display unit of a mobile phone or the like. The liquid crystal display device includes a liquid crystal display panel, and a backlight which irradiates the liquid crystal display panel with light.

As a light source of the backlight, a white light emitting diode is used in the small liquid crystal display device. In the liquid crystal display device in which the white light emitting diode is used as the light source of the backlight, the white light emitting diode is driven with a constant current using a voltage which is stepped up in a main step-up voltage circuit, in an LED driving circuit which drives the white light emitting diode. An LED backlight driving circuit which drives an LED backlight is disclosed in JP2011-138666A.

In general, an LED driving circuit includes a main step-up voltage circuit which drives a white light emitting diode, and the main voltage step-up circuit includes a smoothing capacitor.

In addition, in a liquid crystal display device which uses a white light emitting diode as a light source of a backlight, in general, brightness of the backlight is adjusted by a PWM (Pulse Width Modulation) control which varies a duty ratio in periods of ON/OFF of the white light emitting diode.

When brightness of the backlight is adjusted by a PWM control, a current which flows in the white light emitting diode fluctuates between 0% and 100%. When a ceramic capacitor is used as the smoothing capacitor of the main voltage step-up circuit in a LED driving circuit, there is a problem in that the ceramic capacitor generates a sound since voltages at both ends of the ceramic capacitor fluctuate.

In order to solve the problem, as the smoothing capacitor of the main voltage step-up circuit, in the related art, an aluminum electrolytic capacitor, or a functional polymer capacitor has been used, instead of the ceramic capacitor.

However, in the aluminum electrolytic capacitor, or the functional polymer capacitor, there are problems such as (1) a life span is shorter than the ceramic capacitor, (2) internal resistances are high, (3) shapes of components are large, (4) a usable temperature range is small, and the like.

SUMMARY OF THE INVENTION

The present invention has been made in order to solve problems in the related art, and an object of the present invention is to provide a technology in which a ceramic capacitor can be used as a smoothing capacitor of a main voltage step-up circuit of a backlight of a liquid crystal display device.

The above described object, other objects and new characteristics of the present invention will be clarified by descriptions, and accompanying drawings in the specification.

When a summary of representative matters in the invention which is disclosed in the present application will be described as follows;

(1) A liquid crystal display device includes a liquid crystal display panel; a backlight which includes at least one light emitting diode; a main voltage step-up circuit which steps up a power supply voltage, and applies the stepped up voltage to the at least one light emitting diode; and an auxiliary step-up voltage circuit which is ON when the main step-up voltage circuit is OFF, and which compensates a potential change in a smoothing capacitor, in which the main voltage step-up circuit includes a smoothing capacitor which is formed by a ceramic capacitor at an output end of the main voltage step-up circuit.

(2) A liquid crystal display device includes a liquid crystal display panel; a backlight which includes at least one light emitting diode; a main voltage step-up circuit which steps up a power supply voltage, and applies the stepped up voltage to the at least one light emitting diode; and a main control circuit which controls and drives the main voltage step-up circuit; and an auxiliary voltage step-up circuit, in which the main voltage step-up circuit includes a coil of which one end is connected to a power supply, a main switching element which is connected between the other end of the coil and a ground potential, and which ON/OFF thereof is controlled by the main control circuit, a diode which is connected to the other end of the coil, and a smoothing capacitor which is connected to the diode, in which the smoothing capacitor is a ceramic capacitor, in which the auxiliary voltage step-up circuit which is connected to the other end of the coil, is ON when the main step-up voltage circuit is OFF, and compensates a potential change in the smoothing capacitor is included, and the auxiliary voltage step-up circuit includes an auxiliary switching element which is connected between the other end of the coil and a ground potential, and an auxiliary control circuit which controls ON/OFF of the auxiliary switching element.

(3) In (2), the main control circuit controls ON/OFF of the main voltage step-up circuit based on a PWM signal which is input from the outside, in which the auxiliary switching element is a switching transistor, and the auxiliary control circuit is configured of an oscillator and an AND circuit which is connected to a control electrode of the switching transistor, and obtains a logical conjunction between an output of the oscillator and an inversion signal of the PWM signal.

(4) In (2), the main control circuit sets the main voltage step-up circuit to an ON state when a PWM signal which is input from the outside is a first voltage level, and sets the main voltage step-up circuit to an OFF state when the PWM signal is a second voltage level which is different from the first voltage level, in which the auxiliary control circuit includes an oscillator; a differential circuit to which an output of the oscillator is input; a resistance element which is connected between an output end of the differential circuit and a ground potential; and a third switching element which is connected between the output end of the differential circuit and a ground potential, in which the auxiliary switching element and the third switching element are switching transistors, the switching transistor which configures the auxiliary switching element has a control electrode connected to the output end of the differential circuit, and the switching transistor which configures the third switching element is ON when the PWM signal is the first voltage level, and is OFF when the PWM signal is the second voltage level.

Effects which are obtained by representative matters in the invention which is disclosed in the present application will be simply described as follows.

According to the present invention, as a smoothing capacitor of a backlight of a liquid crystal display device, it is possible to use a ceramic capacitor which is low cost and small compared to an aluminum electrolytic capacitor, or the like.

BRIEF DESCRIPTION OF THE DRAWINGS

FIG. 6 is a timing chart of the LED driving circuit of the liquid crystal display device in the related art.

DETAILED DESCRIPTION OF THE INVENTION

Figure 1:
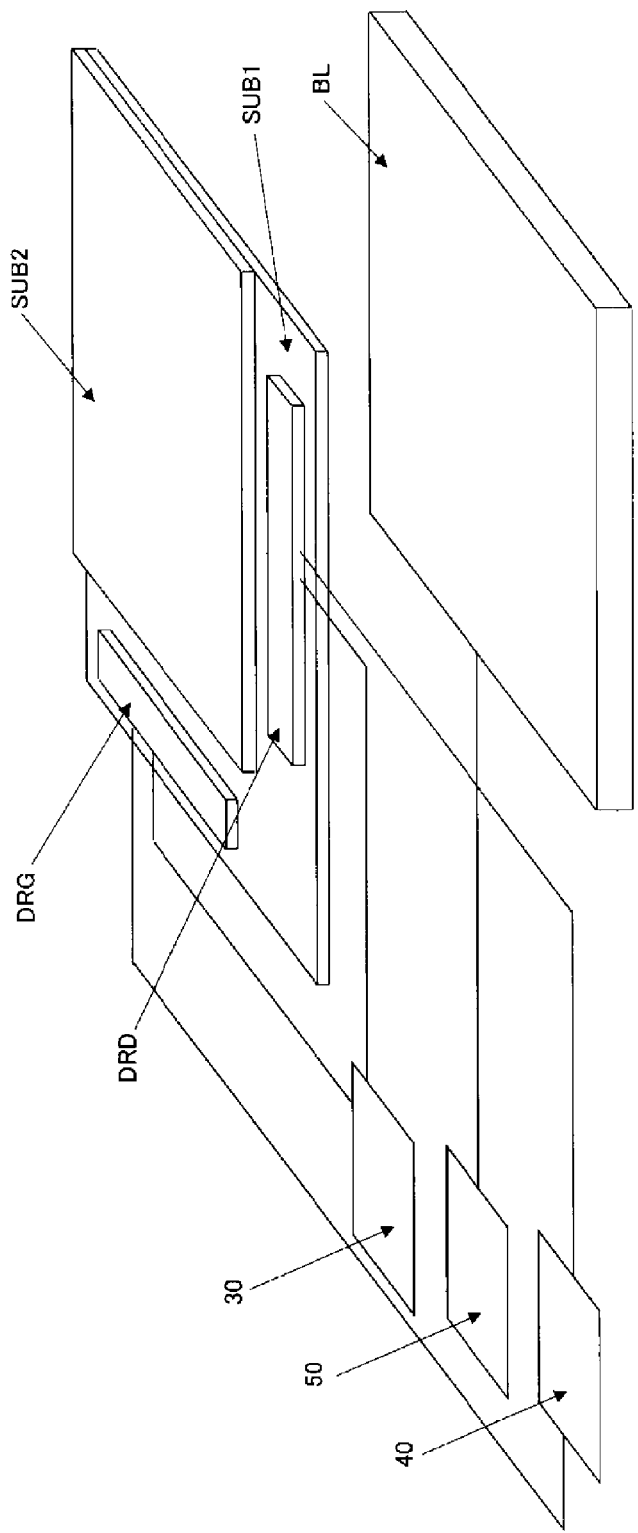
FIG. 1 is a block diagram which illustrates a schematic configuration of a liquid crystal display device according to an embodiment of the present invention.

Hereinafter, embodiments of the present invention will be described in detail with reference to drawings.

In addition, in all of the drawings for describing the embodiments, the same components having the same functions will be given the same reference characters, and repeated descriptions thereof will be omitted. In addition, the scope of claims of the present invention is not construed by the embodiments below.

[First Embodiment]

FIG. 1 is a block diagram which illustrates a schematic configuration of a liquid crystal display device according to an embodiment of the present invention. The liquid crystal display device according to the embodiment includes a liquid crystal panel, and a backlight (BL). The liquid crystal panel includes a first substrate (SUB 1) and a second substrate (SUB 2). A thin film transistor, a pixel electrode, or the like are formed on the first substrate (SUB 1), and a light shielding film, a color filter, or the like are formed on the second substrate (SUB 2). In addition, if it is a liquid crystal panel of a lateral electric field system such as an IPS system, or the like, a counter electrode is formed on the first substrate (SUB 1), and if it is a liquid crystal display panel of a longitudinal electric field system such as a VA system, or the like, the counter electrode is formed on the second substrate (SUB 2).

The liquid crystal panel is configured by bonding the first substrate (SUB 1) and the second substrate (SUB 2) through a sealing member, injecting liquid crystal between the first substrate (SUB 1) and the second substrate (SUB 2), and sealing the liquid crystal. In addition, polarizing plates (not shown) are provided at the outside of the first substrate (SUB 1) and second substrate (SUB 2), respectively. In addition, since the present invention is not directly related to a structure of the liquid crystal display panel, the structure of the liquid crystal display panel will be omitted.

A video line driving circuit (DRD) is arranged in the vicinity of one side of two long sides of the first substrate (SUB 1), and a scanning line driving circuit (DRG) is arranged in the vicinity of one side of two short sides of the first substrate (SUB 1).

The video line driving circuit (DRD) and the scanning line driving circuit (DRG) are controlled and driven by a display control circuit (timing controller) 30. In addition, in FIG. 1, a case has been described in which the video line driving circuit (DRD) and the scanning line driving circuit (DRG) are configured of one semiconductor chip, respectively, however, the video line driving circuit (DRD) and the scanning line driving circuit (DRG) may be configured of one integral semiconductor chip.

The backlight (BL) includes a white light emitting diode (not shown) as a light source, and the white light emitting diode is driven by an LED driving circuit 50.

A power supply circuit 40 supplies a voltage to the video line driving circuit (DRD) and the scanning line driving circuit (DRG) for driving each pixel.

Figure 5:
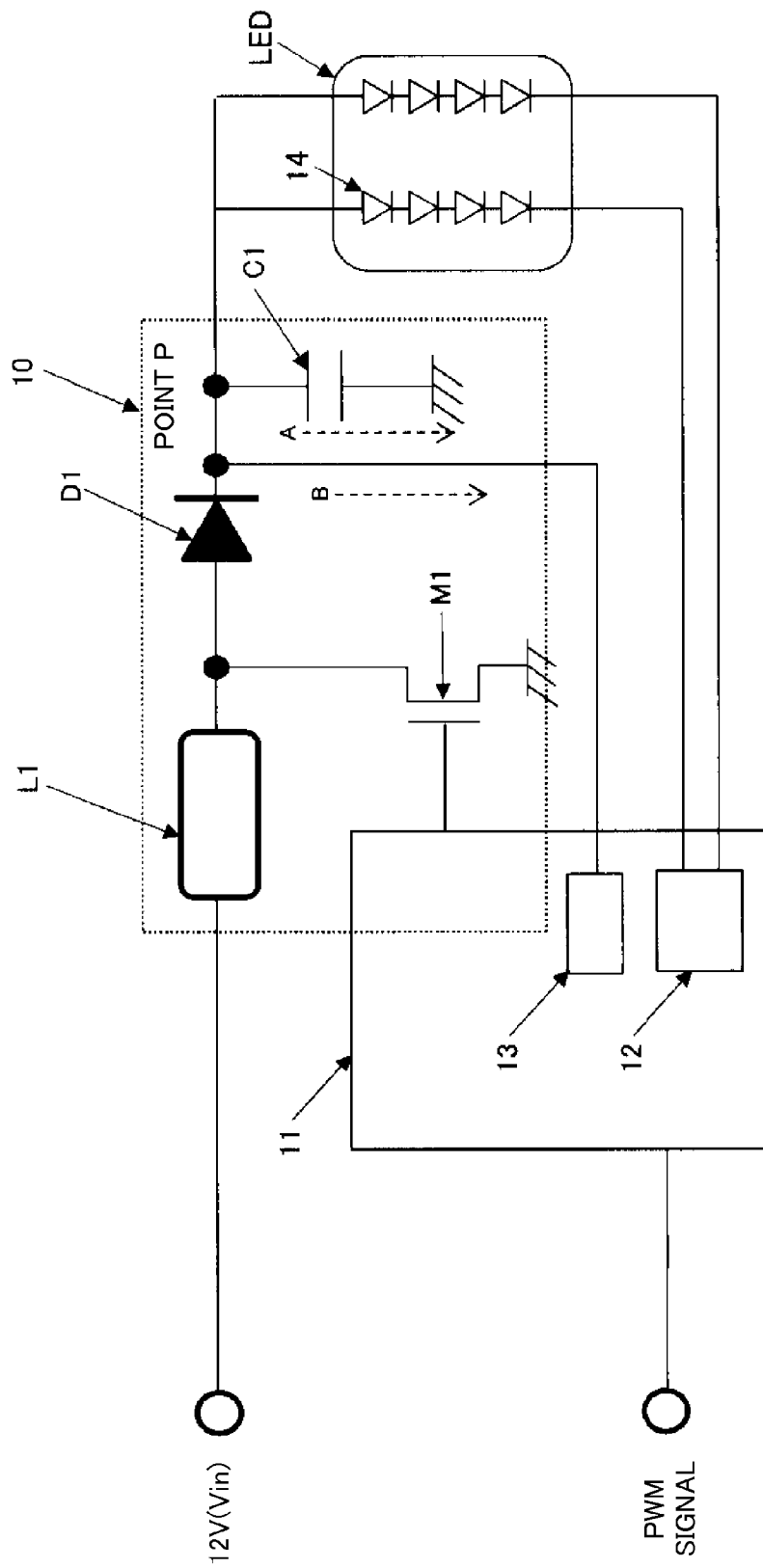
FIG. 5 is a circuit diagram which illustrates a circuit configuration of an LED driving circuit of a liquid crystal display device in the related art.

FIG. 5 is a circuit diagram which illustrates a circuit configuration of an LED driving circuit of a liquid crystal display device in the related art. First, problems in the LED driving circuit in the related art will be described using FIG. 5.

An LED driving circuit 50 in the related art which is illustrated in FIG. 5 is configured of a main voltage step-up circuit 10, and an LED driver control IC (11).

The main voltage step-up circuit 10 is configured of a coil (L1), a diode (D1), a smoothing capacitor (C1), and an n-type MOS transistor (M1) which configures a main switching element. The main voltage step-up circuit 10 is configured of a DC-DC converter of a switching method (chopper method), which converts a voltage of 12 V which is supplied from the power supply circuit 40 to a driving voltage (for example, 50 V) which is suitable for driving a plurality of white light emitting diode columns (LED) and outputs the converted voltage. Here, the n-type MOS transistor (M1) is ON/OFF controlled by the LED driver control IC (11).

In addition, the LED driver control IC (11) includes a voltage monitoring unit (13) which monitors whether or not a voltage of the smoothing capacitor (C1) is abnormal, and a constant current circuit unit 12 which maintains a current which flows in the respective plurality of white light emitting diode columns (LED) to be constant.

The LED driver control IC (11) converts the voltage of 12 V which is supplied from the power supply circuit 40 to a driving voltage (for example, 50 V) which is suitable for driving the plurality of white light emitting diode columns (LED) by controlling ON/OFF of the n-type MOS transistor (M1), and the LED driver control IC (11) controls ON/OFF of the n-type MOS transistor (M1) so that a current which flows in the respective white light emitting diode columns (LED) of the plurality of white light emitting diode columns (LED) becomes stable.

In addition, a Pulse Width Modulation (PWM) signal is input to the LED driver control IC (11) from the outside, and when the PWM signal is a high level (hereinafter, referred to as H level), the LED driver control IC (11) performs the ON/OFF control of the n-type MOS transistor (M1), and drives the respective white light emitting diodes 14 of the plurality of white light emitting diode columns (LED) with a constant current.

In addition, when the PWM signal is a low level (hereinafter, referred to as L level), the LED driver control IC (11) sets the n-type MOS transistor (M1) to an OFF state at all times, and makes a current which flows in the respective white light emitting diodes 14 of the plurality of white light emitting diode columns (LED) zero.

In this manner, light emitting times of the respective white light emitting diodes 14 of the plurality of white light emitting diode columns (LED) are controlled, and brightness of the backlight is adjusted (hereinafter, referred to as PWM dimming).

FIG. 6 is a timing chart of an LED driving circuit of a liquid crystal display device in the related art.

As illustrated in part c of FIG. 6, when the brightness of the backlight is adjusted by a PWM signal, a current which flows in the respective white light emitting diodes 14 of the plurality of white light emitting diode columns (LED) fluctuates between 0% and 100%.

At this time, as illustrated in part a and b of FIG. 6, the main voltage step-up circuit 10 performs a step-up operation when a current flows in the white light emitting diodes 14 which is included in the respective plurality of white light emitting diode columns (LED) (that is, when PWM signal is H level), and stops the step-up operation when a current does not flow in the white light emitting diodes 14 which is included in the respective plurality of white light emitting diode columns (LED) (that is, when PWM signal is L level).

When the main voltage step-up circuit 10 stops the step-up operation, an electric charge of the smoothing capacitor (C1) flows to the outside by a leak current of the smoothing capacitor (C1) itself (current which is denoted by dotted line A in FIG. 5), and a leak current which passes through the voltage monitoring unit 13 (current which is denoted by dotted line B in FIG. 5), thus as illustrated in part d of FIG. 6, voltages at both ends of the smoothing capacitor (C1) (that is, voltage at point P in FIG. 5) decrease.

That is, when performing the PWM dimming, since a start and stop of the step-up operation of the main voltage step-up circuit 10 is repeated, the voltages at both ends of the smoothing capacitor (C1) also fluctuate.

When the ceramic capacitor is used in the smoothing capacitor (C1), there is a problem in that a shape of the ceramic capacitor is deformed due to a change in potential, and a sound is generated. For this reason, as the smoothing capacitor (C1), an aluminum electrolytic capacitor, a functional polymer capacitor, or the like has been used in the related art. In addition, when the aluminum electrolytic capacitor, or the functional polymer capacitor is used as the smoothing capacitor (C1), there have been problems such as (1) a life span is shorter than the ceramic capacitor, (2) internal resistances are high, (3) shapes of components are large, and (4) a usable temperature range is small.

Figure 2:
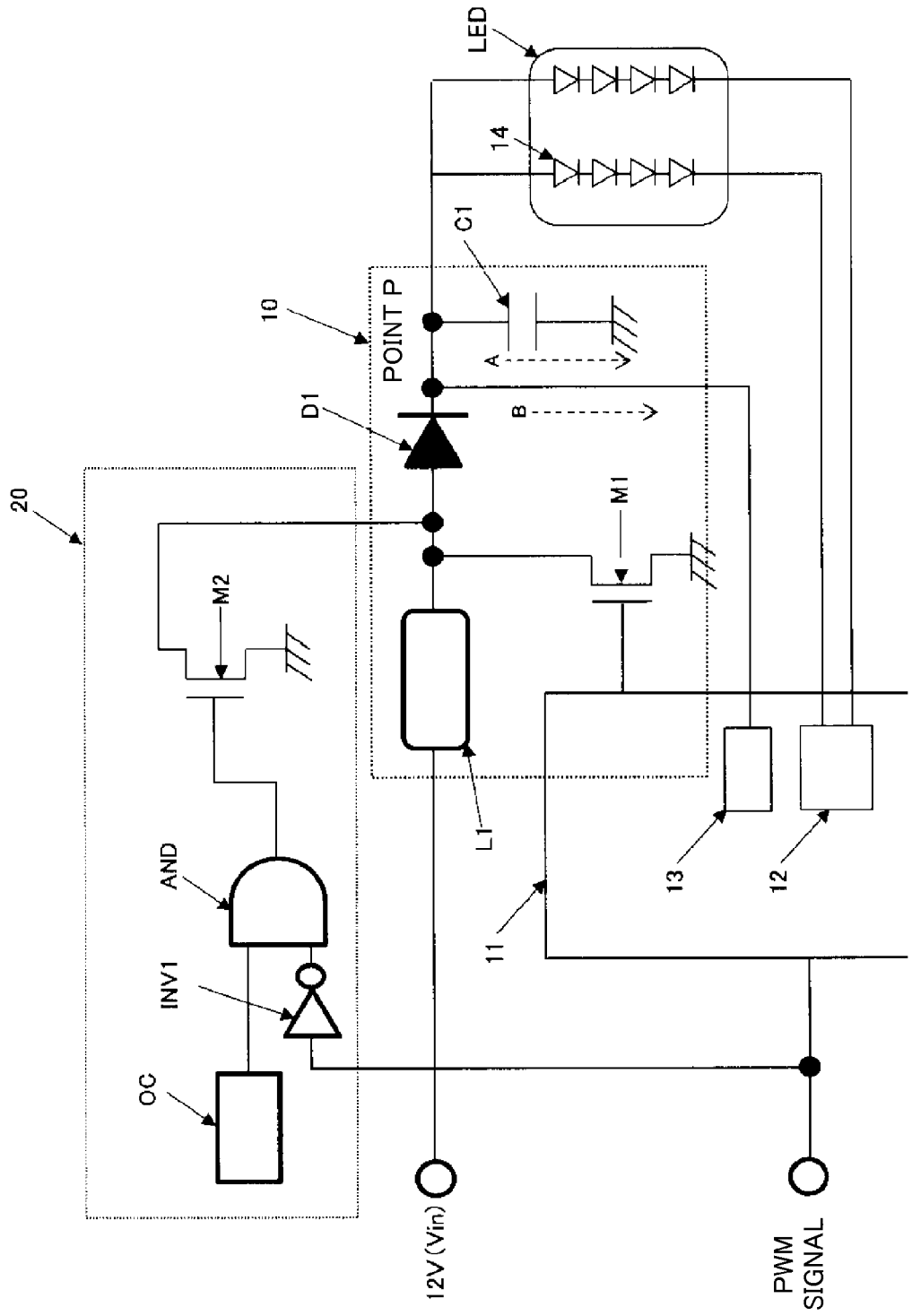
FIG. 2 is a circuit diagram which illustrates an example of a circuit configuration of an LED driving circuit of the liquid crystal display device according to the embodiment.
Figure 3:
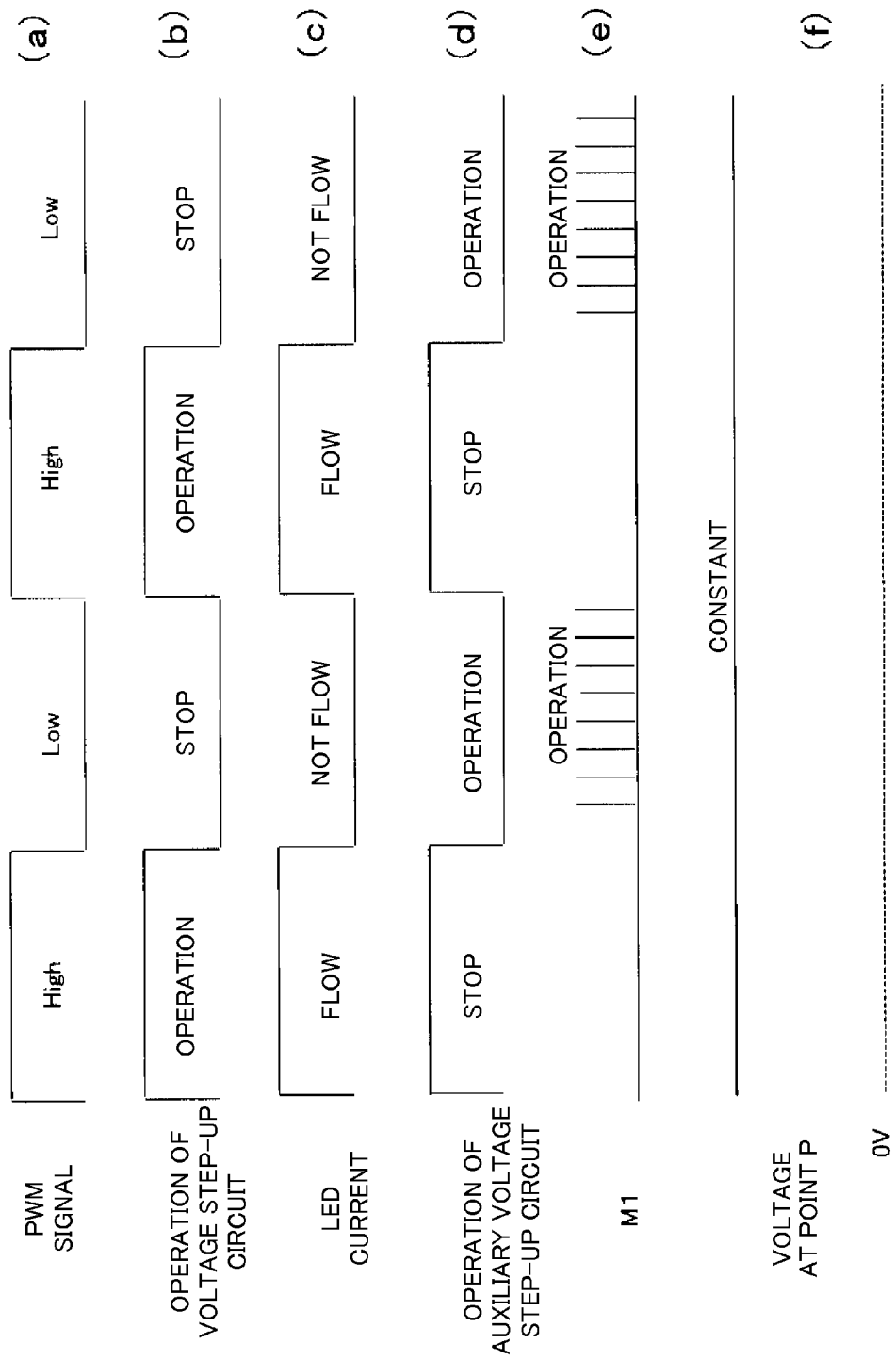
FIG. 3 is a timing chart of the LED driving circuit of the liquid crystal display device according to the embodiment.

FIG. 2 is a circuit diagram which illustrates a circuit configuration of the LED driving circuit of the liquid crystal display device according to the first embodiment of the present invention, and FIG. 3 is a timing chart of the LED driving circuit of the liquid crystal display device according to the first embodiment of the present invention.

As illustrated in FIG. 2, the LED driving circuit 50 according to the embodiment is different from the LED driving circuit 50 which is illustrated in FIG. 5 in a point that an auxiliary voltage step-up circuit 20 is connected to a node which is connected between the coil (L1) and the diode (D1).

The auxiliary voltage step-up circuit 20 according to the embodiment is ON when a PWM signal is the L level, and the main voltage step-up circuit 10 is OFF as illustrated in part b and d of FIG. 3, and compensates for a potential change of the smoothing capacitor (C1). Here, when the main voltage step-up circuit 10 is OFF, the n-type MOS transistor (M1) which configures a main switching element is OFF at all times, and a current does not flow in the white light emitting diodes 14 of the respective plurality of white light emitting diode columns (LED).

As illustrated in FIG. 2, according to the embodiment, the auxiliary voltage step-up circuit 20 is configured of a clock oscillator (clock generator; OC), an AND circuit (AND) to which an output of the clock oscillator (OC) and a reverse PWM signal which is reversed in an inverter (INV1) are input, and an n-type MOS transistor (M2) in which an output of the AND circuit (AND) is input to a gate.

Since the n-type MOS transistor (M2) is connected between a node to which a coil (L1) and a diode (D1) are connected to each other and a ground potential, when a PWM signal is the L level, and the clock oscillator (OC) outputs a clock, the n-type MOS transistor becomes an ON state.

That is, as illustrated in part e of FIG. 3, the n-type MOS transistor (M2) is intermittently ON when the PWM signal is the L level, charges the smoothing capacitor (C1) by performing an ON/OFF control of a current which flows in the coil (L1), and as illustrated in part f of FIG. 3, makes the potential change in voltages at both ends of the smoothing capacitor (C1) (that is, voltages at point P in FIG. 2) small.

In this manner, the voltages in the smoothing capacitor (C1) (voltages at point P in FIG. 2) are stabled, and even when the ceramic capacitor is used as the smoothing capacitor (C1) of the main voltage step-up circuit 10, the shape of the ceramic capacitor is not changed, and there is no sound generated.

In addition, since the ceramic capacitor is small and low cost compared to the aluminum electrolytic capacitor, the functional polymer capacitor, or the like, it is possible to make the whole LED driving circuit including the main voltage step-up circuit small, and to make operating life longer.

<Second Embodiment>

Figure 4:
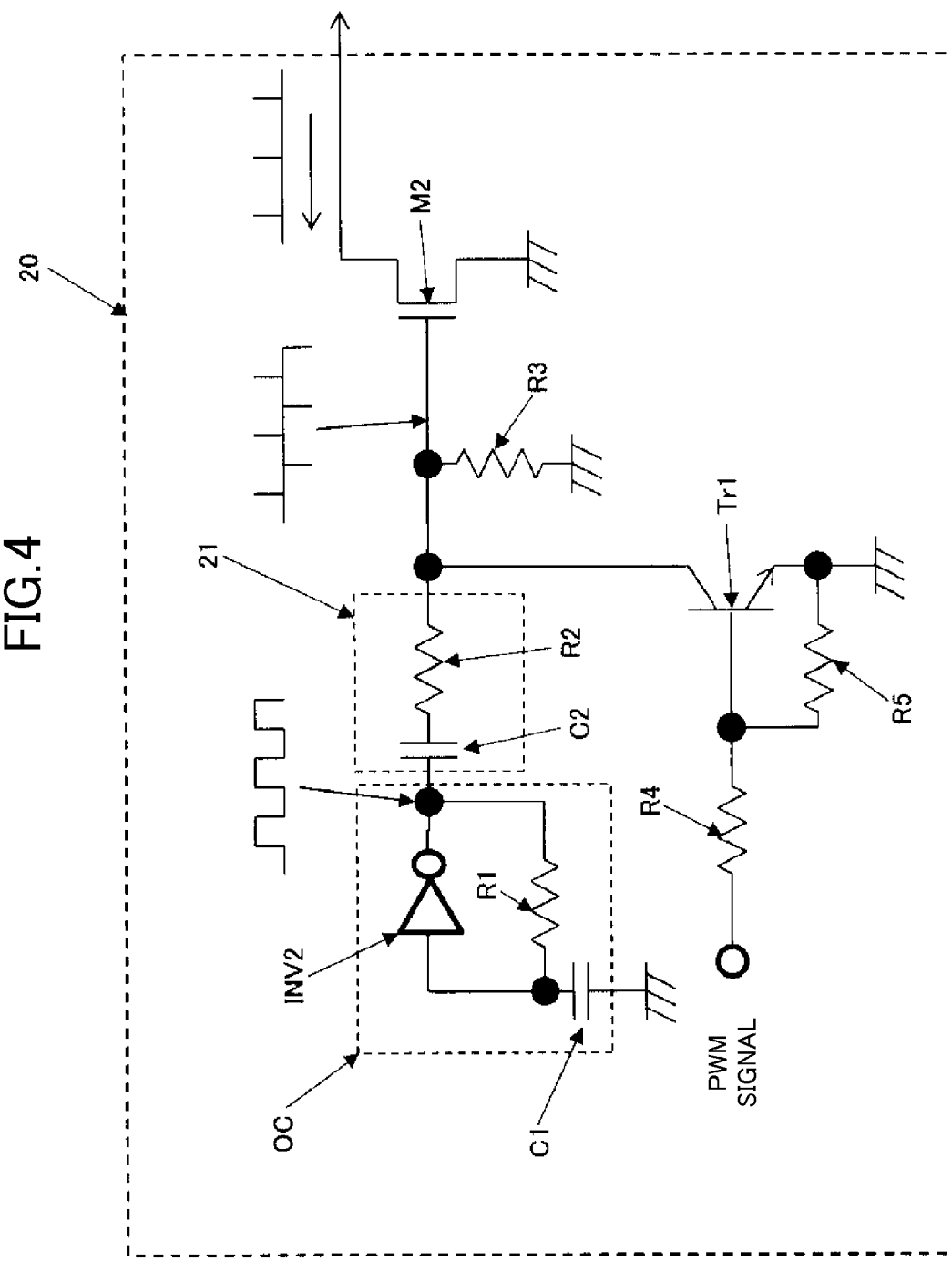
FIG. 4 is a circuit diagram which illustrates another example of a circuit configuration of an auxiliary voltage step-up circuit of the LED driving circuit.

FIG. 4 is a circuit diagram which illustrates a circuit configuration of an auxiliary voltage step-up circuit of an LED driving circuit of a liquid crystal display device according to a second embodiment of the present invention.

As illustrated in FIG. 4, according to the embodiment, an auxiliary voltage step-up circuit 20 is configured of a clock oscillator (clock generator; OC), a differential circuit 21, an NPN bipolar transistor (Tr1), and the n-type MOS transistor (M2). A gate of the n-type MOS transistor (M2) is connected to a node to which the differential circuit 21 and the NPN bipolar transistor (Tr1) are connected each other. In addition, a resistance element (R3) is connected between the gate of the n-type MOS transistor (M2) and a ground potential.

In addition, the clock oscillator (OC) is configured of an inverter (INV2), a resistance element (R1) which is connected to both ends of the inverter (INV2), and a smoothing capacitor (C1) which is connected between an input end of the inverter (INV2) and a ground potential.

In addition, a resistance element (R5) is connected between a base and an emitter of the NPN bipolar transistor (Tr1), and a PWM signal is input to the base of the NPN bipolar transistor (Tr1) through a resistance element (R4).

Accordingly, when a PWM signal is the H level, the NPN bipolar transistor (Tr1) is ON, the ground potential is input to the gate of the n-type MOS transistor (M2), and the n-type MOS transistor (M2) is set to be OFF at all times.

In addition, when a PWM signal is the L level, the NPN bipolar transistor (Tr1) is OFF and is intermittently ON by an output of the differential circuit 21, and the smoothing capacitor (C1) is charged by performing ON/OFF of a current which flows in the coil (L1).

In this manner, the auxiliary voltage step-up circuit 20 according to the above described each embodiment reduces a potential change in the smoothing capacitor (C1) by supplying a current corresponding to a leak current 1 (current denoted by dotted line A in FIG. 2), and a leak current 2 (current denoted by dotted line B in FIG. 2) which are illustrated in FIG. 2.

In order to supply the current corresponding to the leak currents, a period of ON time (Ton) of the n-type MOS transistor (M2) becomes, $$Ton = \sqrt{\frac{Vo \times 2 \times Io \times L \times T}{Vi^2}}$$
$$= \frac{50V \times 2 \times 260\mu A \times 10vH \times 10\mu sec}{12V \times 12}$$
$$= 0.134 \mu sec$$

when setting as follows;
  leak current 1=10 µA
  leak current 2=250 µA
  input voltage (Vi)=12 V
  output voltage (Vo)=50 V
  period of time (t) of auxiliary voltage step-up circuit=10 µsec. (operation frequency 100 kHz)
  coil (L1)=10 µH
and Duty becomes 1.34%.

A value of the smoothing capacitor C2, and values of the resistance elements R2 and R3 which are illustrated in FIG. 4 are set so that the period of time Ton is the above calculated value. For example, when the smoothing capacitor (C2) is 100 pF, the resistance element (R2) is 1.5 KΩ, and the resistance element (R3) is 100 KΩ, the auxiliary voltage step-up circuit 20 which is illustrated in FIG. 4 is able to reduce the potential change in the smoothing capacitor (C1) by supplying the leak current 1 (current denoted by dotted line A in FIG. 2), and the leak current 2 (current denoted by dotted line B in FIG. 2) which are illustrated in FIG. 2.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
  a liquid crystal display panel;
  a backlight which includes at least one light emitting diode;
  a main voltage step-up circuit which steps up a power supply voltage, and applies the stepped up voltage to the at least one light emitting diode;
  a main control circuit which controls and drives the main voltage step-up circuit; and
  an auxiliary voltage step-up circuit,
  wherein the main voltage step-up circuit includes
  a coil of which one end is connected to a power supply;
  a main switching element which is connected between the other end of the coil and a ground potential, and which ON/OFF thereof is controlled by the main control circuit;
  a diode which is connected to the other end of the coil; and
  a smoothing capacitor which is connected to the diode, the smoothing capacitor being a ceramic capacitor,
  wherein the auxiliary voltage step-up circuit is connected to the other end of the coil and configured to charge the smoothing capacitor,
  the auxiliary voltage step-up circuit is ON when the main step-up voltage circuit is OFF, and compensates a potential change in the smoothing capacitor is included, and
  wherein the auxiliary voltage step-up circuit includes
  an auxiliary switching element which is connected between the other end of the coil and a ground potential; and
  an auxiliary control circuit which controls ON/ OFF of the auxiliary switching element.

2. The liquid crystal display device according to claim 1,
  wherein the main control circuit controls ON/OFF of the main voltage step-up circuit based on a PWM signal which is input from the outside,
  wherein the auxiliary switching element is a switching transistor, and
  wherein the auxiliary control circuit is configured of an oscillator and an AND circuit which is connected to a control electrode of the switching transistor, and obtains a logical conjunction between an output of the oscillator and an inversion signal of the PWM signal.

3. The liquid crystal display device according to claim 1,
  wherein, the main control circuit sets the main voltage step-up circuit to an ON state when a PWM signal which is input from the outside is a first voltage level, and sets the main voltage step-up circuit to an OFF state when the PWM signal is a second voltage level which is different from the first voltage level,
  wherein the auxiliary control circuit includes
  an oscillator;
  a differential circuit to which an output of the oscillator is input;
  a resistance element which is connected between an output end of the differential circuit and a ground potential; and
  a third switching element which is connected between the output end of the differential circuit and a ground potential,
  wherein the auxiliary switching element and the third switching element are switching transistors,
  wherein the switching transistor which configures the auxiliary switching element has a control electrode connected to the output end of the differential circuit, and
  wherein the switching transistor which configures the third switching element is ON when the PWM signal is the first voltage level, and is OFF when the PWM signal is the second voltage level.

4. The liquid crystal display device according to any one of claims 1 to 3,
  wherein the auxiliary switching element is an MOS transistor.

5. The liquid crystal display device according to claim 3,
  wherein the third switching element is an NPN bipolar transistor.

* * * * *